(12) United States Patent
Yoshihara

(10) Patent No.: US 6,931,386 B2
(45) Date of Patent: Aug. 16, 2005

(54) PATTERN CLASSIFICATION METHOD AND APPARATUS THEREOF, AND COMPUTER READABLE STORAGE MEDIUM

(75) Inventor: Takafumi Yoshihara, Machida (JP)

(73) Assignee: Olympus Optical Co., Ltd., Tokyo (JP)

( * ) Notice: Subject to any disclaimer, the term of this patent is extended or adjusted under 35 U.S.C. 154(b) by 88 days.

(21) Appl. No.: 10/146,837

(22) Filed: May 16, 2002

(65) Prior Publication Data
US 2002/0143719 A1 Oct. 3, 2002

Related U.S. Application Data

(63) Continuation of application No. PCT/JP01/08230, filed on Sep. 21, 2001.

(30) Foreign Application Priority Data

Sep. 25, 2000 (JP) .......................................... 2000-289957

(51) Int. Cl.$^7$ ................................................ G06N 5/02
(52) U.S. Cl. .............................. 706/48; 706/12; 706/14
(58) Field of Search ............................. 706/48, 12, 14; 704/254

(56) References Cited

U.S. PATENT DOCUMENTS

| | | | | |
|---|---|---|---|---|
| 5,329,596 A | * | 7/1994 | Sakou et al. ................ | 382/226 |
| 5,544,256 A | * | 8/1996 | Brecher et al. ............. | 382/149 |
| 5,893,058 A | * | 4/1999 | Kosaka ........................ | 704/254 |
| 6,539,102 B1 | * | 3/2003 | Anderson et al. ........... | 382/128 |

FOREIGN PATENT DOCUMENTS

| | | |
|---|---|---|
| JP | 05-114051 A | 5/1993 |
| JP | 05-233880 A | 9/1993 |
| JP | 07-225836 A | 8/1995 |
| JP | 08-050636 A | 2/1996 |
| WO | WO 98/36372 A1 | 8/1998 |

* cited by examiner

Primary Examiner—Joseph P. Hirl
(74) Attorney, Agent, or Firm—Frishauf, Holtz, Goodman & Chick, P.C.

(57) ABSTRACT

A pattern classification method extracts a quantity of pattern characteristics from a pattern classification target, registers/sets in a pattern dictionary classification category information corresponding to the quantity of pattern characteristics, performs pattern classification based on the quantity of pattern characteristics and a Mahalanobis dictionary registered in the pattern dictionary, and creates the Mahalanobis dictionary by effecting optimization processing of the pattern dictionary based on the classification category name and the quantity of pattern characteristics.

9 Claims, 13 Drawing Sheets

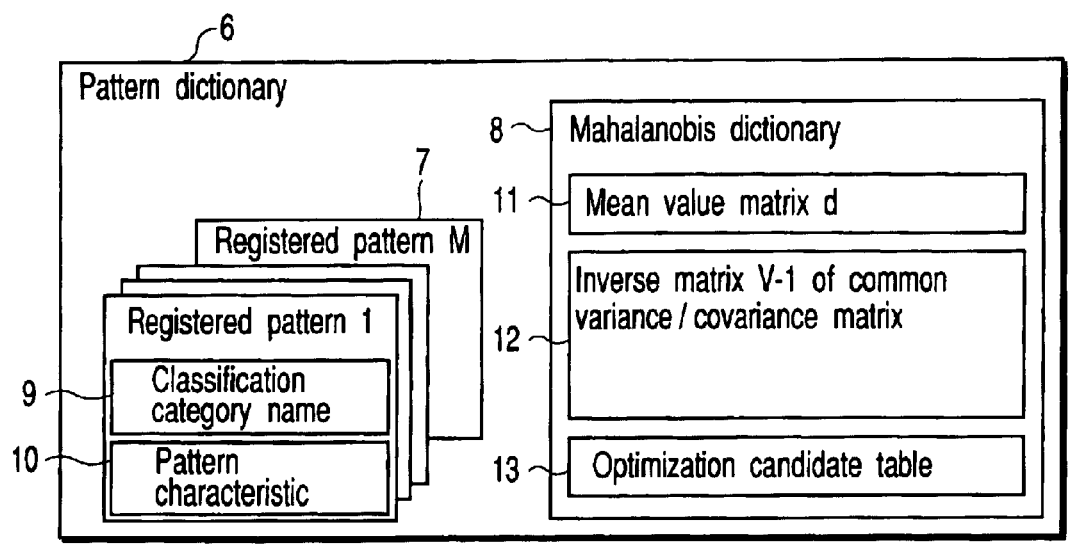

FIG. 3

| Optimization candidate table | | |
|---|---|---|
| Utilized characteristic weighting matrix 1 | Predicted classification ratio 1 | Mean classification distance 1 |
| Utilized characteristic weighting matrix 2 | Predicted classification ratio 2 | Mean classification distance 2 |
| Utilized characteristic weighting matrix 3 | Predicted classification ratio 3 | Mean classification distance 3 |
| Utilized characteristic weighting matrix K | Predicted classification ratio K | Mean classification distance K |

FIG. 4

$$\begin{bmatrix} a_1 & 0 & 0 & 0 & 0 \\ 0 & a_2 & 0 & 0 & 0 \\ 0 & 0 & a_3 & 0 & 0 \\ 0 & 0 & 0 & \cdots & 0 \\ 0 & 0 & 0 & 0 & a_N \end{bmatrix}$$

FIG. 5

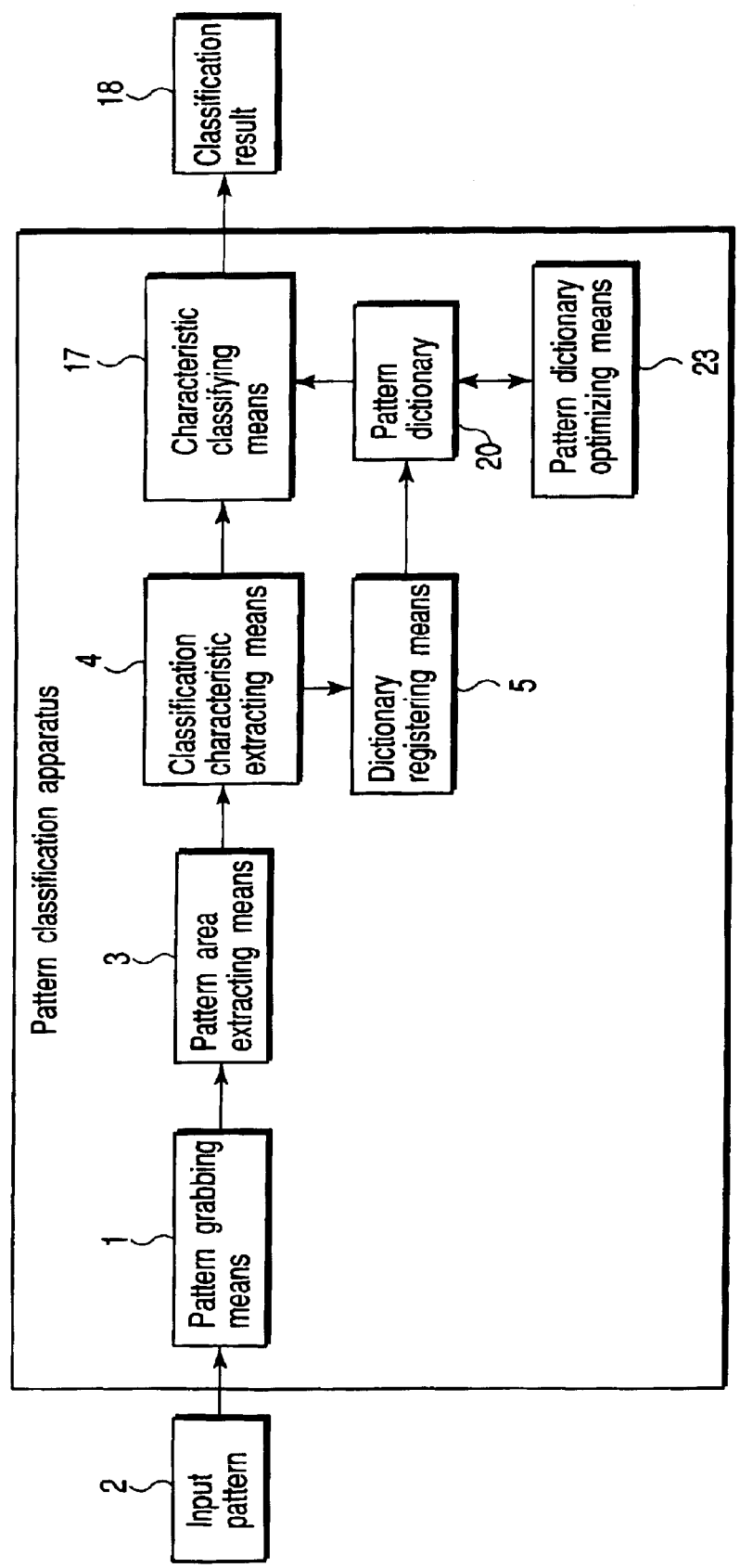
F I G. 10

Optimization candidate table ~21

| Utilized characteristic information (22) | Predicted classification ratio (15) | Mean classification distance (16) |
|---|---|---|
| Utilized characteristic information 1 | Predicted classification ratio 1 | Mean classification distance 1 |
| Utilized characteristic information 2 | Predicted classification ratio 2 | Mean classification distance 2 |
| Utilized characteristic information 3 | Predicted classification ratio 3 | Mean classification distance 3 |

FIG. 11

Utilized characteristic information
(N is total number of types of pattern characteristics) 22

| Characteristics | a | b | c | d | e | f | g | h | ... | N |
|---|---|---|---|---|---|---|---|---|---|---|
| Use / non-use (use:1,non-use:0) | 1 | 1 | 0 | 1 | 0 | 0 | 1 | 1 | | 0 |

FIG. 12

PATTERN CLASSIFICATION METHOD AND APPARATUS THEREOF, AND COMPUTER READABLE STORAGE MEDIUM

CROSS-REFERENCE TO RELATED APPLICATIONS

This is a Continuation Application of PCT Application No. PCT/JP01/08230, filed Sep. 21, 2001, which was not published under PCT Article 21(2) in English.

This application is based upon and claims the benefit of priority from the prior Japanese Patent Application No. 2000-289957, filed Sep. 25, 2000, the entire contents of which are incorporated herein by reference.

BACKGROUND OF THE INVENTION

1. Field of the Invention

The present invention relates to a pattern classification method and apparatus applied to, e.g., extraction of defects and an optimization processing of a pattern dictionary used for pattern classification of types of defects and the like, and to a storage medium readable by a computer.

2. Description of the Related Art

For example, as inspection of a glass substrate of an LCD or inspection of a semiconductor wafer, for example, an image of a glass substrate is picked up in order to obtain its image data, a quantity of pattern characteristics such as an area, a shape or a depth value of a defect is extracted from the image data, and inspection is performed with respect to the extracted quantity of pattern characteristics by using the following pattern classification method.

A pattern dictionary created based on a known quantity of pattern characteristics and its classification category information is registered in advance. Here, the quantity of pattern characteristics is, for example, an area, a shape or a depth value if it is applied to the inspection of the glass substrate. The classification category information is, for example, a type of a pattern defect, a foreign particle, indefiniteness and defocusing.

When the quantity of pattern characteristics of a pattern classification target (input pattern) is inputted, there is carried out pattern matching processing with respect to the quantity of pattern characteristics and the pattern dictionary. As a classification result, numeric information such as a classification category, a similarity or a distance is outputted.

The input pattern is classified into a classification category having a most appropriate value (a value close to 1 in case of the similarity, or a value close to 0 in case of the distance) in the numeric information as the classification result, or the numeric information as the classification result is compared with a given threshold value. If the numeric information is not more than (or not less than) the threshold value, it is determined.

In regard to the similarity or the distance used as the numeric information, a simple similarity or a composite similarity is utilized as a similarity scale. As a distance scale, the Euclidean distance, the urban distance, the Mahalanobis distance or the like is utilized.

The simple similarity as the similarity scale is defined by determining as an evaluation scale s the cosine of an angle formed by a characteristic quantity vector g which is registered in advance and a characteristic quantity vector g' which is newly extracted.

$$s = (g, g')/(\|g\| \cdot \|g'\|) \quad (1)$$

Here, (,) indicates an inner product. The similarity s depends on only a direction (that is, an angle) of the characteristic quantity vector, but does not depend on the greatness of the vector. In regard to the similarity scale, as conversion into the distance scale s', the following distance conversion is often carried out:

$$s' = 1.0 - \text{simple similarity} \quad (2)$$

The composite similarity is a similarity value with distribution states of a plurality of learning characteristic quantity vectors taken in to consideration. By using a fixed value $\lambda j$ of the registered characteristic quantity vector and a fixed vector $u_j$, the evaluation scale s with respect to the newly extracted characteristic quantity vector g is defined as follows:

$$s = \Sigma_{j=1,} \lambda_j (g^t u_j)^2 / (\lambda_1 \|g\|^2) \quad (3)$$

Thus, improvement in the classification accuracy can be expected as compared with the simple similarity method, but many sets of learning data are required.

As the distance scale, the Euclidean distance d which is the most common distance scale is defined as follows based on the registered characteristic quantity vector g and the newly extracted characteristic quantity vector g':

$$d = \sqrt{(g-g')^2} \quad (4)$$

The urban distance is also call the Manhattan distance, and defined as follows based on the registered characteristic quantity vector g and the newly extracted characteristic quantity vector g':

$$d = |g - g'| \quad (5)$$

According to the urban distance, it is possible to calculate the distance with high-speed.

The Mahalanobis distance $D^2$ is a distance with dispersion of the registered characteristic quantity vector data taken into consideration as similar to the composite similarity, and it is considered to be presently most preferable for the pattern classification. The Mahalanobis distance $D^2$ can be expressed as follows:

$$D^2 = d^t V^{-1} d \quad (6)$$

In the above expression, it is assumed that an inverse matrix of a common variance/covariance matrix of classification category data $xi$ ($=x_{i0}, x_{i1}, x_{i2}, \ldots, x_{ip}$: i is a classification category and p is a number of dimensions of a characteristic quantity) is $V^{-1}$, a difference matrix with respect to a classification category mean value $xi\hat{\ }$ is d ($=xi - xi\hat{\ }$) and its transpose is $d^t$.

The Mahalanobis distance $D^2$ is a distance obtained by normalization with each data dispersion of the classification category data. If two sets of the classification category data are uncorrelated, the Mahalanobis distance is equivalent to the Euclidean distance. Further, if the difference matrix d is taken as a difference from the classification category mean value in the above expression (6), the Mahalanobis distance becomes the Mahalanobis general distance between the classification categories.

For example, assuming that there are classification characteristic quantities $x_{c1}$ and $x_{c2}$ of a given classification category C and there is the positive correlation between these classification characteristic quantities $x_{c1}$ and $x_{c2}$, such an iso-probability ellipse as shown in FIG. 1 can be drawn. In FIG. 1, given characteristic quantity data A and B are arranged provided that they are equally distanced from the classification category mean value G on the Euclidean distance scale. However, the Mahalanobis distances $D^2$ become equal on a locus of the iso-probability ellipse shown in FIG. 1. Since the characteristic quantity data A and B are not positioned on the locus of the same iso-probability ellipse and the Mahalanobis distance of the characteristic data A is close to the classification category mean value G, the characteristic quantity data A is closer to the classification category mean value G than the characteristic quantity data B.

Among the various kinds of scales mentioned above, it is said that the Mahalanobis distance is a distance scale currently most preferable for the pattern classification. Furthermore, although a quantity of arithmetic operation processing is large and a large quantity of registered/learning patterns must be secured, the Mahalanobis distance has begun to be utilized in most pattern classification devices with the recent speed-up of the CPU.

The numeric information of the Mahalanobis distance or the like as a classification result can be obtained by performing pattern matching processing of a pattern dictionary created in advance and an input pattern. The pattern dictionary used in the pattern matching processing, and the pattern dictionary for calculating the Mahalanobis distance in particular, has as constituent elements the inverse matrix $V^{-1}$ of the common variance/covariance matrix V of the classification category data and the classification category mean value $xi\hat{}$ as represented in the expression (6). These constituent elements are previously obtained from many known quantities of pattern characteristics registered in the pattern dictionary in advance and their classification category information.

In order to create the pattern dictionary for calculating the Mahalanobis distance (the inverse matrix $V^{-1}$ and the classification category mean value $xi\hat{}$), the registered quantities of pattern characteristics and theirs classification category information are simply used, or some of quantities of pattern quantities which are customarily considered to be suitable for pattern classification are selected by trial and error.

For example, if the pattern dictionary for calculating the Mahalanobis distance is created by utilizing all the registered quantities of pattern characteristics, it is often the case that some of the quantities of pattern characteristics adversely affect, thereby lowering the pattern classification accuracy (pattern classification ratio).

Moreover, it can be considered that the pattern dictionary for calculating the Mahalanobis distance is created by utilizing quantities of pattern characteristics with high contribution obtained by analyzing main components of the registered quantities of pattern characteristics in favor among the quantities of pattern characteristics which adversely affect the pattern classification ratio. However, since the contribution obtained by analysis of main components only indicates the quantity of pattern characteristics which efficiently represents the pattern, the contribution does not directly relate to the pattern classification ratio. That is, even if the quantity of the pattern characteristics with the high contribution is selectively used, the pattern classification ratio is not necessarily improved.

It can be also considered that the case in which the registered quantity of pattern characteristics does not demonstrate the normal distribution is taken into account as a factor affecting calculation of the Mahalanobis distance and the distribution of the registered quantity of pattern characteristics is approximated to one or a plurality of normal distributions, thereby calculating the Mahalanobis distances with respect to one or a plurality of the normal distributions. However, it is usually difficult to determine a plurality of normal distributions which approximate the distribution of the quantity of pattern characteristics which is multi-dimension data.

BRIEF SUMMARY OF THE INVENTION

It is an object of the present invention to provide a pattern classification method and apparatus which have pattern characteristic quantity weighting matrix searching processing for optimally searching a quantity of pattern characteristics for calculating a Mahalanobis distance which is suitable for pattern classification processing and weighting the quantity of pattern characteristics utilized for calculating the Mahalanobis distance, and a storage medium.

According to the present invention, there is provided a pattern classification method comprising: extracting a quantity of pattern characteristics from a pattern classification target; registering and setting classification category information corresponding to the quantity of pattern characteristics in a pattern dictionary; and performing pattern classification based on the quantity of pattern characteristics and a Mahalanobis dictionary registered in the pattern dictionary, wherein the pattern dictionary optimization processing is carried out based on the classification category name and the quantity of pattern characteristics stored in the pattern dictionary, thereby creating the Mahalanobis dictionary.

According to the present invention, there is provided a pattern classification apparatus comprising: a pattern dictionary storing therein a quantity of pattern characteristics extracted from a pattern classification target and classification category information corresponding to the quantity of pattern characteristics; means for performing pattern classification based on the quantity of pattern characteristics and a Mahalanobis dictionary registered in the pattern dictionary; and pattern dictionary optimizing means for creating the Mahalanobis dictionary by performing optimization processing based on the classification category name and the quantity of pattern characteristics stored in the pattern dictionary.

According to another aspect of the present invention, there is provided a pattern classification apparatus comprising: pattern fetching means for fetching a pattern classification target; pattern area cutting means for cutting out a specific pattern area from the pattern classification target supplied from the pattern fetching means; classification characteristic quantity extracting means for calculating a quantity of pattern characteristics useful for pattern classification from the specific pattern area supplied from the pattern area cutting means; dictionary registering means for registering and setting the quantity of pattern characteristics calculated by the classification characteristic quantity extracting means and classification category information corresponding to the quantity of pattern characteristics in a pattern dictionary; characteristic quantity classifying means for performing pattern classification based on the quantity of pattern characteristics calculated by the classification characteristic quantity extracting means and the Mahalanobis dictionary registered in the pattern dictionary; and pattern dictionary optimizing means for creating the Mahalanobis dictionary by performing optimization processing based on the classification category name and the quantity of pattern characteristics stored in the pattern dictionary.

According to the present invention, there is provided a storage medium readable by a computer, the storage medium storing therein a program of a pattern classification method comprising: registering and setting a quantity of pattern characteristics extracted from a pattern classification target and classification category information corresponding to the quantity of pattern characteristics in a pattern dictionary; creating a Mahalanobis dictionary by performing optimization processing based on the classification category name and the quantity of pattern characteristics stored in the pattern dictionary; and performing pattern classification based on the optimized quantity of pattern characteristics and the Mahalanobis dictionary registered in the pattern dictionary.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram showing a data structure of a pattern dictionary in the first embodiment of the pattern classification apparatus according to the present invention;

FIG. 4 is a diagram of an optimization candidate table in the first embodiment of the pattern classification apparatus according to the present invention;

FIG. 5 is a view showing a utilized characteristic quantity weighting matrix in the first embodiment of the pattern classification device according to the present invention;

FIG. 10 is a block diagram showing a second embodiment of a pattern classification apparatus according to the present invention;

FIG. 11 is a type drawing of an optimization candidate table in a Mahalanobis dictionary in the second embodiment of the pattern classification apparatus according to the present invention;

FIG. 12 is a type drawing of utilized characteristic quantity information in the second embodiment of the pattern classification apparatus according to the present invention;

DETAILED DESCRIPTION OF THE INVENTION

A first embodiment according to the present invention will now be described hereinafter with reference to the accompanying drawings.

Figure 1:
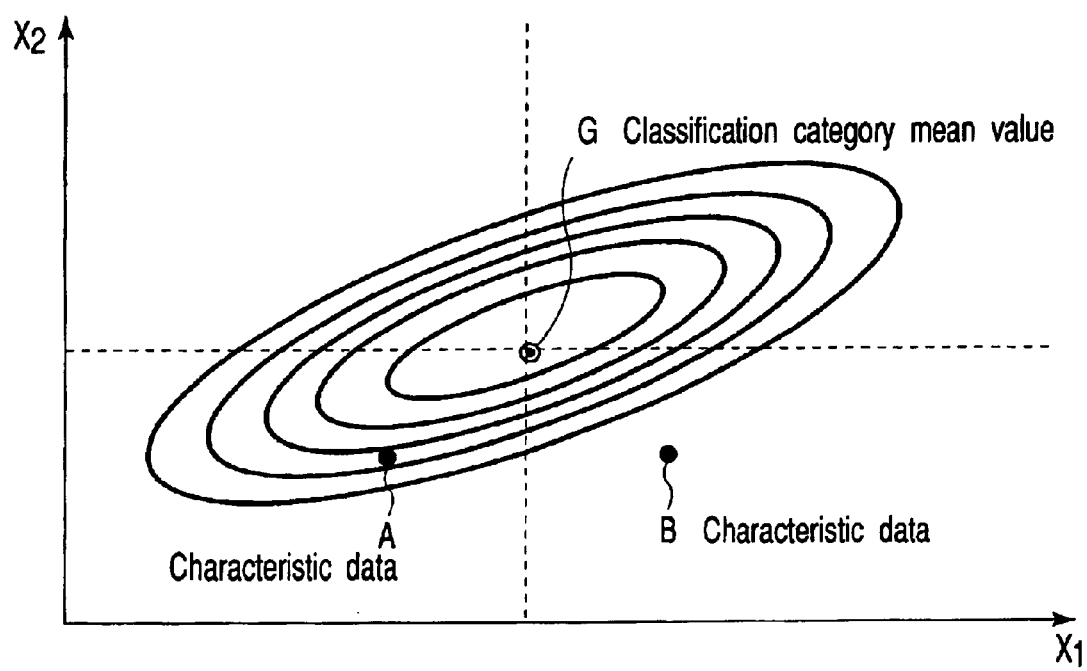
FIG. 1 is a view to explain a Mahalanobis distance.
Figure 2:
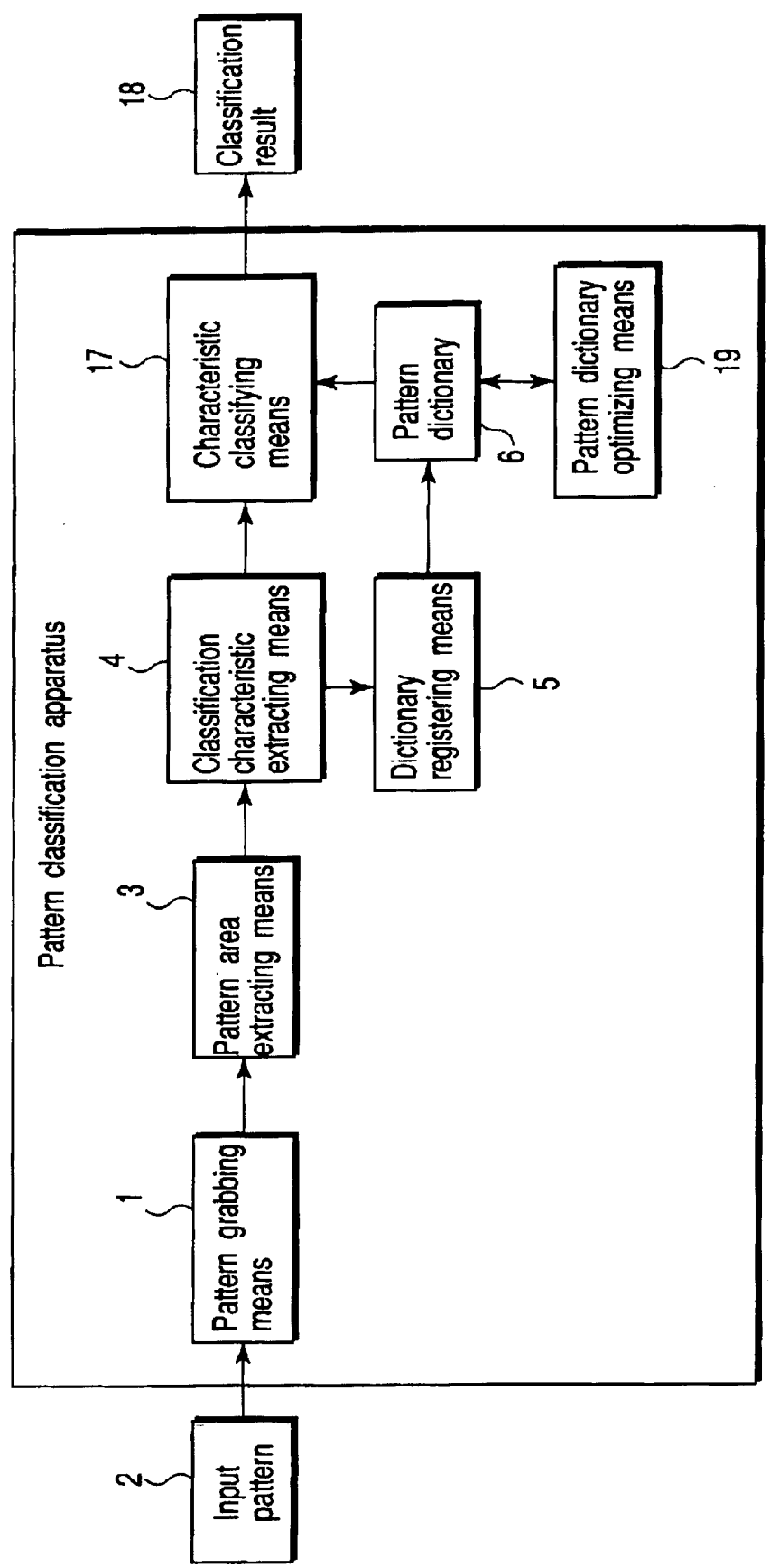
FIG. 2 is a block diagram showing a first embodiment of a pattern classification apparatus according to the present invention.

FIG. 2 is a block diagram showing a pattern classification apparatus. Pattern fetching means 1 fetches an input pattern 2 which can be a pattern classification target, for example, image data obtained by picking up an image of a glass substrate as an input pattern 2. In the present invention, the pattern is not restricted to shapes of defects concerning defect extraction and it may take any form such as color as long as it can be patterned as data.

Pattern area cutting means 3 cuts out (extracts) a specific pattern area which can be a target from the input pattern 2 supplied from the pattern fetching means 1. The pattern area cutting means 3 extracts a specific pattern area from the input pattern 2 by performing at least one of various kinds of filtering processing or binarization processing and supplies this specific pattern area to classification characteristic quantity extracting means 4.

The classification characteristic quantity extracting means 4 calculates a quantity of pattern characteristics useful for pattern classification from the specific pattern area supplied from the pattern area cutting means 3, for example, an area, a shape, a depth value or the like of a defect on the glass substrate as long as it can be applied to inspection of the glass substrate as mentioned above. The classification characteristic quantity extracting means 4 supplies the calculated quantity of pattern characteristics to dictionary registering means S and characteristic quantity classifying means 17, respectively.

The dictionary registering means 5 registers/sets the quantity of pattern characteristics calculated by the classification characteristic quantity extracting means 4 and classification category information corresponding to this quantity of pattern characteristics, for example, a type of a pattern defect, a foreign particle, unevenness, indefiniteness or defocusing, etc. in a pattern dictionary 6.

The pattern dictionary 6 stores a plurality of registered patterns 7 (M=1, 2, 3, . . . ,) and a Mahalanobis dictionary 8 as shown in the type drawing of a data structure in FIG. 3. Each registered pattern 7 stores a classification category name 9 and a quantity of pattern characteristics 10, respectively. One or more registered patterns 7 having the same classification category name 9 are registered.

The Mahalanobis dictionary 8 includes: a mean value matrix (d) 11 which is a matrix of c×N; an inverse matrix ($V^{-1}$) 12 of a common variance/covariance matrix which is a matrix of N×N; and an optimization candidate table 13, provided that a number of classification category names 9 is c and a number of types of the quantity of pattern characteristics 10 is N. Elements of the optimization candidate table 13 are a plurality of utilized characteristic quantity weighting matrices (1 to K) 14 which become diagonal matrices of N×N as shown in FIG. 4 (see FIG. 5), a plurality of predicted classification ratios (1 to K) 15, and a plurality of mean classification distances (1 to K) 16. Here, the utilized characteristic quantity weighting matrices (1 to K) 14 are A in the following expression (7) and correspond to correction matrices of $V^{-1}$. Further, the predicted classification ratios (1 to K) 15 are classification ratios with patterns registered in the pattern dictionary being determined as unknown patterns. The mean classification distances (1 to K) 16 are mean values of the Mahalanobis distances calculated when obtaining the predicted classification ratios.

Characteristic quantity classifying means 17 performs pattern classification based on the quantity of pattern characteristics calculated by the classification characteristic quantity extracting means 4 and the Mahalanobis dictionary 8 registered in the pattern dictionary 6. That is, the characteristic quantity classifying means 17 calculates the Mahalanobis distance $D^2$, thereby obtaining its classification result 18. Here, the Mahalanobis distance $D^2$ is calculated by using the following expression (7):

$$D^2 = d^t A V^{-1} A d \qquad (7)$$

It is to be noted that A is the utilized characteristic quantity weighting matrix 14 and elements other than a diagonal element are diagonal matrices of 0.

Figure 6:
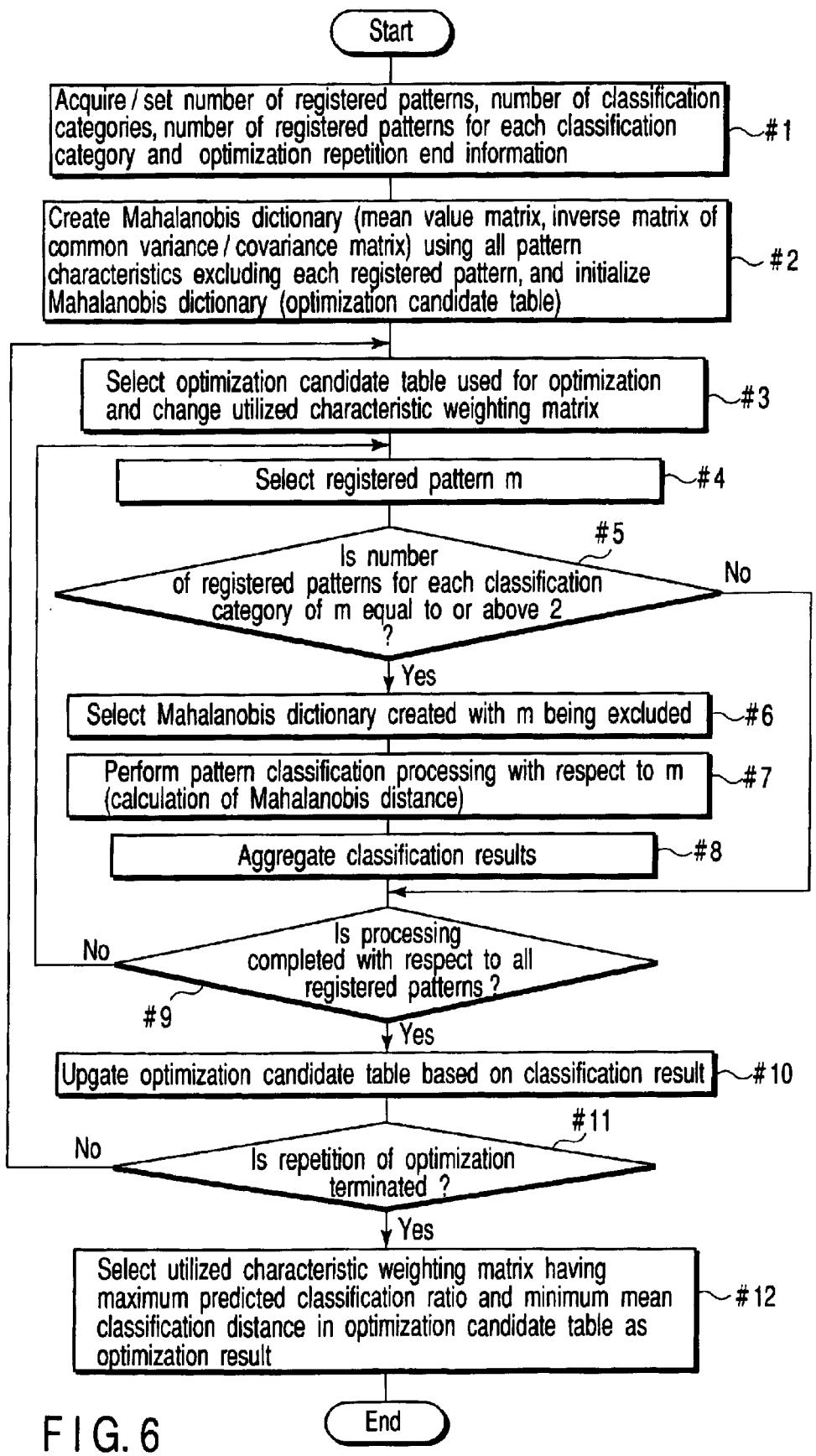
FIG. 6 is a flowchart showing pattern dictionary optimization processing in the first embodiment of the pattern classification apparatus according to the present invention.

Pattern dictionary optimizing means 19 stores a program executing processing shown in a flowchart of pattern dictionary optimization processing such as shown in FIG. 6. Moreover, the pattern dictionary optimizing means 19 effects optimization processing based on the classification category name 9 and the quantity of pattern characteristics 10 stored in the pattern dictionary 6 by executing the stored program, thereby creating the Mahalanobis dictionary. It is to be noted that the program used for executing the pattern dictionary optimization processing is stored in, e.g., a hard disk, a floppy disk or a CD-ROM which are not illustrated.

The concrete operation of the pattern dictionary optimizing means 19 will now be described with reference to the flowchart of the pattern dictionary optimization processing shown in FIG. 6.

The pattern dictionary optimizing means 19 first acquires/sets a number M of registered patterns 7, a number of classification category names 9, a number of registered patterns in accordance with each classification category name 9, and optimization repetition end information at a step #1.

Subsequently, the pattern dictionary optimizing means 19 creates a mean value matrix (d) 11 and an inverse matrix ($V^{-1}$) 12 of the common variance/covariance matrix in the Mahalanobis dictionary 8 using all quantities of pattern characteristics expect each registered pattern 7, and initializes the optimization candidate table 13 in the Mahalanobis dictionary 8 at a step #2.

Figure 7:
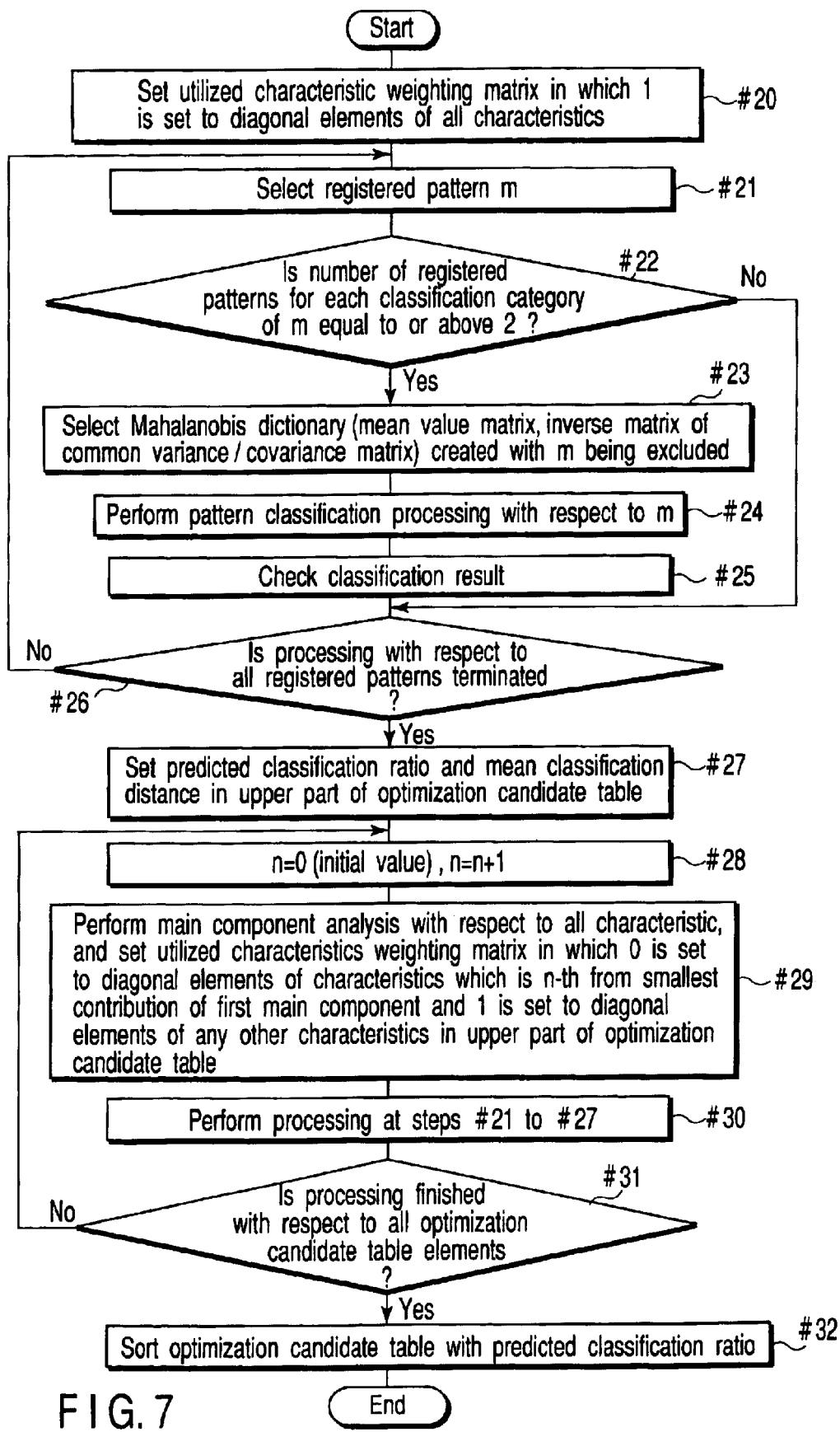
FIG. 7 is a flowchart of a method for initializing the optimization candidate table of a Mahalanobis dictionary in the first embodiment of the pattern classification apparatus according to the present invention.

Specifically, the pattern dictionary optimizing means 19 initializes the optimization candidate table 13 in accordance with a flowchart of an initialization method of the Mahalanobis dictionary (optimization candidate table 13) shown in FIG. 7. Concretely, initialization is carried out as follows.

The pattern dictionary optimizing means 19 first sets the utilized characteristic quantity weighting matrix 14 in which "1" is set to diagonal elements of all quantities of characteristics.

Then, the pattern dictionary optimizing means 19 selects the registered pattern (m) 7 at a step #21. The pattern dictionary optimizing means 19 judges whether a number of registered patterns 7 for each classification category of the selected registered pattern (m) is two or above at a step #22.

If it is found that a number of the registered patterns 7 is two or above as a result of judgment, the pattern dictionary optimizing means 19 advances to a step #23 and selects the Mahalanobis dictionary (the means value matrix (d) 11, the inverse matrix ($V^{-1}$) of the common variance/covariance matrix 12) created excluding the registered pattern (m) 7.

Then, the pattern dictionary optimizing means 19 performs pattern classification processing with respect to the registered pattern (m) 7 at a step #24. The pattern dictionary optimizing means 19 checks a classification result at a step #25, and judges whether classification processing has been terminated with respect to all registered patterns 7 (M=1, 2, 3, . . . ,) at a step S26.

In addition, if the classification processing has been completed with respect to all the registered patterns 7 (M=1, 2, 3, . . . ,), the pattern dictionary optimizing means 19 sets the predicted classification ratios 15 and the mean classification distances 16 in the upper part of the optimization candidate table 13 at a step #27.

Subsequently, the pattern dictionary optimizing means 19 sets n=0 (which is set as an initial value only at a first part of a loop) and n=n+1 at a step #28. The pattern dictionary optimizing means 19 sets a diagonal element of the quantity of characteristics which is the n-th from the smallest contribution of a first main component by analyzing main components with respect to all the quantities of characteristics, and sets the utilized characteristic quantity weighting matrix 14 in which "1" is set to diagonal elements of other quantities of characteristics in the upper part of the optimization candidate table 13.

Then, at a step #30, the pattern dictionary optimizing means 19 repeatedly executes processing at the steps #21 to #27 until settings with respect to the elements in the optimization candidate table 13 are all finished.

When the pattern dictionary optimizing means 19 determines that settings with respect to the elements in the optimization candidate table 13 have been all finished at a step #31, it advances to the next step #32 where the pattern dictionary optimizing means 19 sorts the optimization candidate table 13 with the predicted classification ratio 15. With the above-described processing, optimization of the Mahalanobis dictionary is completed.

Then, the pattern dictionary optimizing means 19 selects an optimization table 13 used for optimization and changes the utilized characteristic quantity weighting matrix 14 at a step #3 shown in FIG. 6. Specifically, selection of elements in the optimization table 13 and changing the utilized characteristic quantity weighting matrix 14 are carried out as follows.

Figure 8:
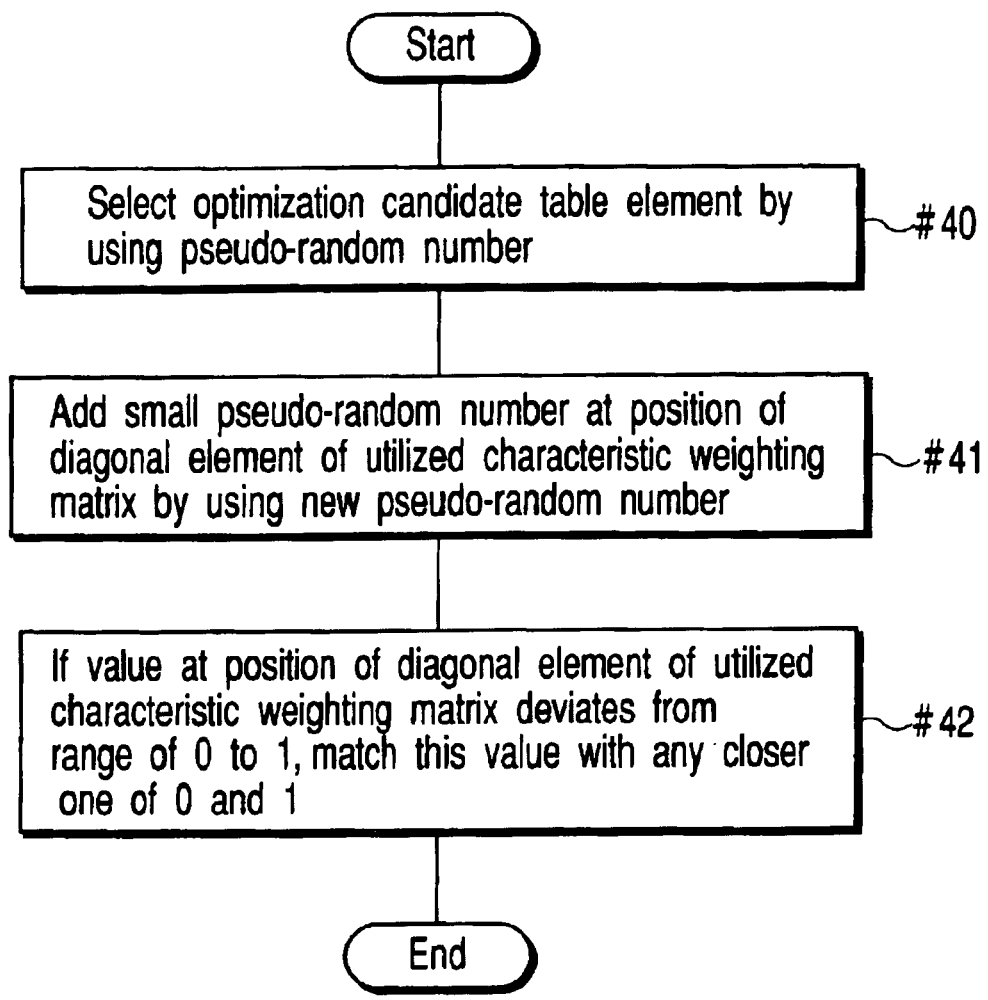
FIG. 8 is a flowchart of a method for selecting the optimization candidate table and changing the utilized characteristic quantity weighting matrix in the first embodiment of the pattern classification apparatus according to the present invention.

The pattern dictionary optimizing means 19 selects the elements in the optimization table 13 and changes the utilized characteristic quantity weighting matrix 14 in accordance with the flowchart of selecting the optimization candidate table elements and changing the utilized characteristic quantity weighting matrix shown in FIG. 8.

At a step #40, the pattern dictionary optimizing means 19 first selects the elements in the optimization candidate table 13 by using a pseudo-random number, namely, the utilized characteristic quantity weighting matrices (1 to K) 14, a plurality of the predicted classification ratios (1 to K) 15 and a plurality of the mean classification distances (1 to K) 16.

Then, at a step #41, the pattern dictionary optimizing means 19 adds a small pseudo-random number to a value at a position of each diagonal element of the utilized characteristic quantity weighting matrix 14 by using a new pseudo-random number.

Subsequently, at a step #42, if values at positions of the diagonal elements of the utilized characteristic quantity weighting matrices (1 to K) deviate from a range of 0 to 1, the pattern dictionary optimizing means 19 matches these values to any closer one of "0" and "1". In this manner, the utilized characteristic quantity weighting matrix 14 is changed.

Then, the pattern dictionary optimizing means 19 selects the registered pattern (m) 7 at the step #4 in FIG. 6, and judges whether a number of the registered patterns 7 for each classification category of the selected registered pattern (m) 7 is not less than 2 at the next step #5.

At the step #5, if a number of the registered patterns 7 is not less than 2, the pattern dictionary optimizing means 19 advances to a step #6 and selects the Mahalanobis dictionary (the mean value matrix (d) 11, the inverse matrix ($V^{-1}$) of the common variance/covariance matrix) 12 created excluding the registered pattern (m) 7.

Then, the pattern dictionary optimizing means 19 performs pattern classification processing with respect to the registered pattern (m) 7, namely, calculates the Mahalanobis distance $D^2$ by using the expression (7) at a step #7.

Subsequently, the pattern dictionary optimizing means 19 aggregates classification results at a step #8.

Then, the pattern dictionary optimizing means 19 judges whether processing has been completed with respect to all the registered patterns 7 (M=1, 2, 3, . . . ,) at a step #9.

If it is found that processing has been completed with respect to all the registered patterns 7 (M=1, 2, 3, . . . ,) as a result of judgment, the pattern dictionary optimizing means 19 advances to a step #10 and updates the optimization candidate table 13 based on the classification results. Specifically, the optimization candidate table 13 is updated as follows.

Figure 9:
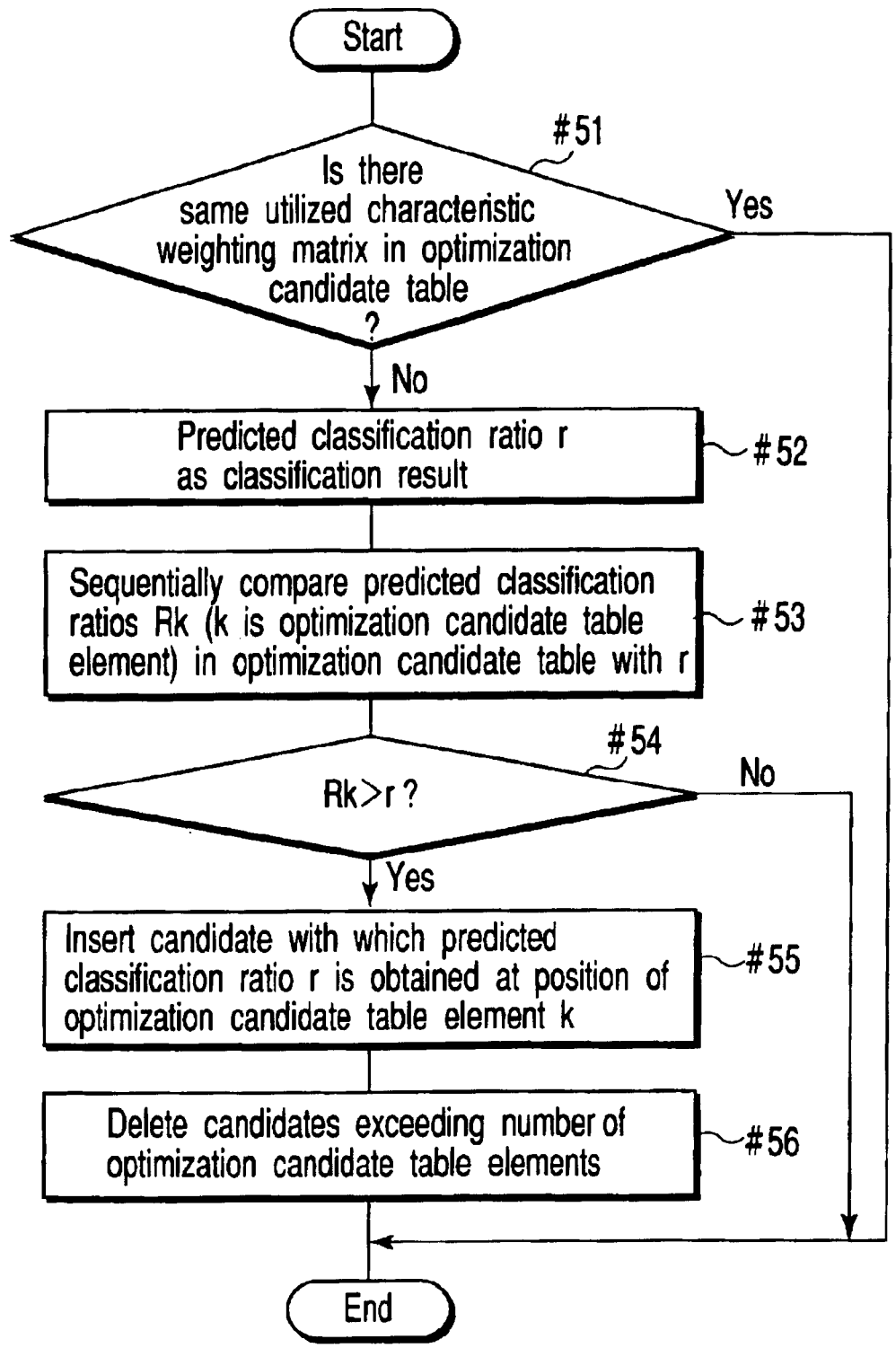
FIG. 9 is a flowchart of a method for updating the optimization candidate table in the first embodiment of the pattern classification apparatus according to the present invention.

The pattern dictionary optimizing means 19 updates the optimization candidate table 13 in accordance with a flowchart of a method of updating the optimization candidate table shown in FIG. 9.

At a step #51, the pattern dictionary optimizing means 19 judges whether the same utilized characteristic quantity weighting matrix 14 already exists in the optimization candidate table 13.

If it is found that the same utilized characteristic quantity weighting matrix 14 already exists as a result of judgment, the pattern dictionary optimizing means 19 calculates a predicted classification ratio r at a step #52.

Then, the pattern dictionary optimizing means 19 sequentially compares the predicted classification ratios Rk (k is optimization candidate table elements) in the optimization candidate table 13 with the predicted classification ratio r at a step #53, and judges whether the predicted classification ratio Rk is larger than the predicted classification ratio r (Rk>r) at the next step #54.

If the predicted classification ratio Rk is larger than the predicted classification ratio r as a result of judgment, the pattern dictionary optimizing means 19 inserts a candidate with which the predicted classification ratio r is obtained into a position of the optimization candidate table element k.

Then, the pattern dictionary optimizing means 19 deletes the candidates which exceed a number of the optimization candidate table elements from, e.g., inferior candidates at a step #56.

Subsequently, the pattern dictionary optimizing means 19 judges whether repetition of optimization has been completed based on the optimization repetition end information at a step #11 shown in FIG. 6. Further, if repetition of optimization is yet to be completed, the pattern dictionary optimizing means 19 returns to the step #3. If repetition has been completed, the pattern dictionary optimizing means 19 advances to a step #12 and selects the utilized characteristic quantity weighting matrix 14 having the maximum predicted classification ratio 15 and the minimum means classification distance 16 in the optimization candidate table 13 as an optimization result.

The characteristic quantity classifying means 17 performs pattern classification based on the quantity of pattern characteristics calculated by the classification characteristic quantity extracting means 4 and the Mahalanobis dictionary 8 registered in the pattern dictionary 6, namely calculates the Mahalanobis distance $D^2$ shown in the expression (7), thereby obtaining a classification result 18 of the quantity of characteristics.

In the first embodiment, there is provided pattern dictionary optimizing means 19 which creates the Mahalanobis dictionary 8 by performing optimization processing based on the classification category names 9 and the quantities of pattern characteristics 10 stored in the pattern dictionary 6. Therefore, it is possible to execute optimization search which can find which quantity of pattern characteristics 10 can effectively act on the pattern classification ratio when it is used for creating the Mahalanobis dictionary 8 with each registered pattern 7 in the pattern dictionary 6 being used as a target. Furthermore, as the accuracy of the optimization search result, it is possible to assure the pattern classification accuracy which is equal to or greater than the pattern classification accuracy in the Mahalanobis dictionary 8 created by utilizing all the quantities of pattern characteristics 10 or the Mahalanobis dictionary 8 created by utilizing the effective quantity of characteristics predicted by, e.g., principle component analysis etc.

When some of the registered patterns 7 in the pattern dictionary 6 are inputted as unknown patterns, it is possible to assure that the pattern classification accuracy has an accuracy of approximately the predicted classification ratio 15 as a classification result outputted.

FIG. 10 is a block diagram showing a pattern classification apparatus according to a second embodiment of the present invention. In FIG. 10, like reference numerals denote the same parts as those in FIG. 2, thereby omitting the detailed explanation. The pattern dictionary 20 includes a plurality of registered patterns 7 (M=1, 2, 3, . . . ,) and a Mahalanobis dictionary as shown in a type drawing of a data structure of FIG. 3. In the second embodiment, the optimization candidate table 21 in the Mahalanobis dictionary 8 has a plurality of sets of utilized characteristic quantity information 22 as one-dimensional information, a plurality of predicted classification ratios (1 to K) 15 and a plurality of mean classification distances (1 to K) 16 as its elements as shown in FIG. 11.

Values of constituent elements of the utilized characteristic information 22 are integers of 0 or 1 as shown in FIG. 12, and a value of each constituent element indicates whether a type of the quantity of pattern characteristic quantity corresponding to that constituent element is used for creating the Mahalanobis dictionary 8. For example, if a value of the constituent element is "0", the type of the quantity of pattern characteristics is not used for creating the Mahalanobis dictionary 8. If it is "1", it indicates that this type of the quantity of pattern characteristics is used for creating the Mahalanobis dictionary 8.

The pattern dictionary optimizing means 23 performs processing for searching the utilized characteristic quantity information indicating whether the quantity of pattern characteristics 10 used for calculating the Mahalanobis distance $D^2$ is utilized by using the quantity of pattern characteristics 10 of the registered pattern 7 and its classification category name 9 in the pattern dictionary 6.

The pattern dictionary optimizing means 23 performs processing for searching the utilized characteristic quantity information indicating whether the quantity of pattern characteristics 10 used for calculating the Mahalanobis distance $D^2$ is utilized by using the quantity of pattern characteristics 10 of the registered pattern 7 and its classification category name 9 in the pattern dictionary 6, thereby creating the Mahalanobis dictionary 8.

Figure 13:
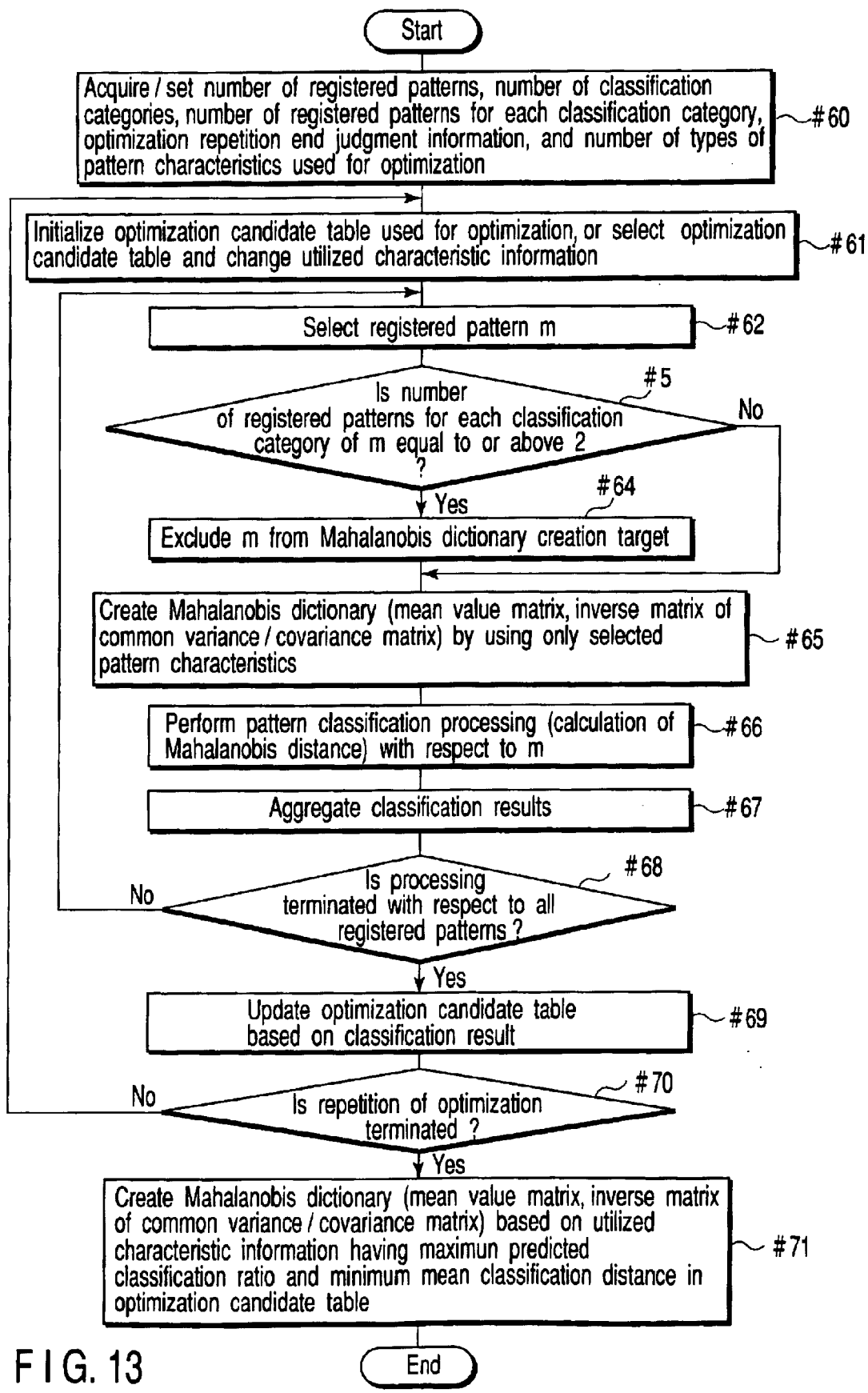
FIG. 13 is a flowchart of pattern dictionary optimization processing in the second embodiment of the pattern classification apparatus according to the present invention.

Concrete description will now be given as to the operation of the pattern dictionary optimizing means 23 with reference to a flowchart of the pattern dictionary optimization processing shown in FIG. 13.

The pattern dictionary optimizing means 23 first acquires/sets a number M of registered patterns 7, a number of classification category names 9, a number of registered patterns for each classification category name 9, optimization repetition end information and a type of the quantity of pattern characteristics 10 used for optimization at a step #60.

Subsequently, the pattern dictionary optimizing means 23 initializes the optimization candidate table 21 used for optimization, or selects the optimization candidate table 21 and changes the utilized characteristic quantity information 22 at a step #61. Concrete initialization of the optimization candidate table 21 (step #81) or selection of the optimization candidate table 21 (step #82) and changing of the utilized characteristic quantity information 22 (steps #81 and #82) are carried out as follows.

Figure 14:
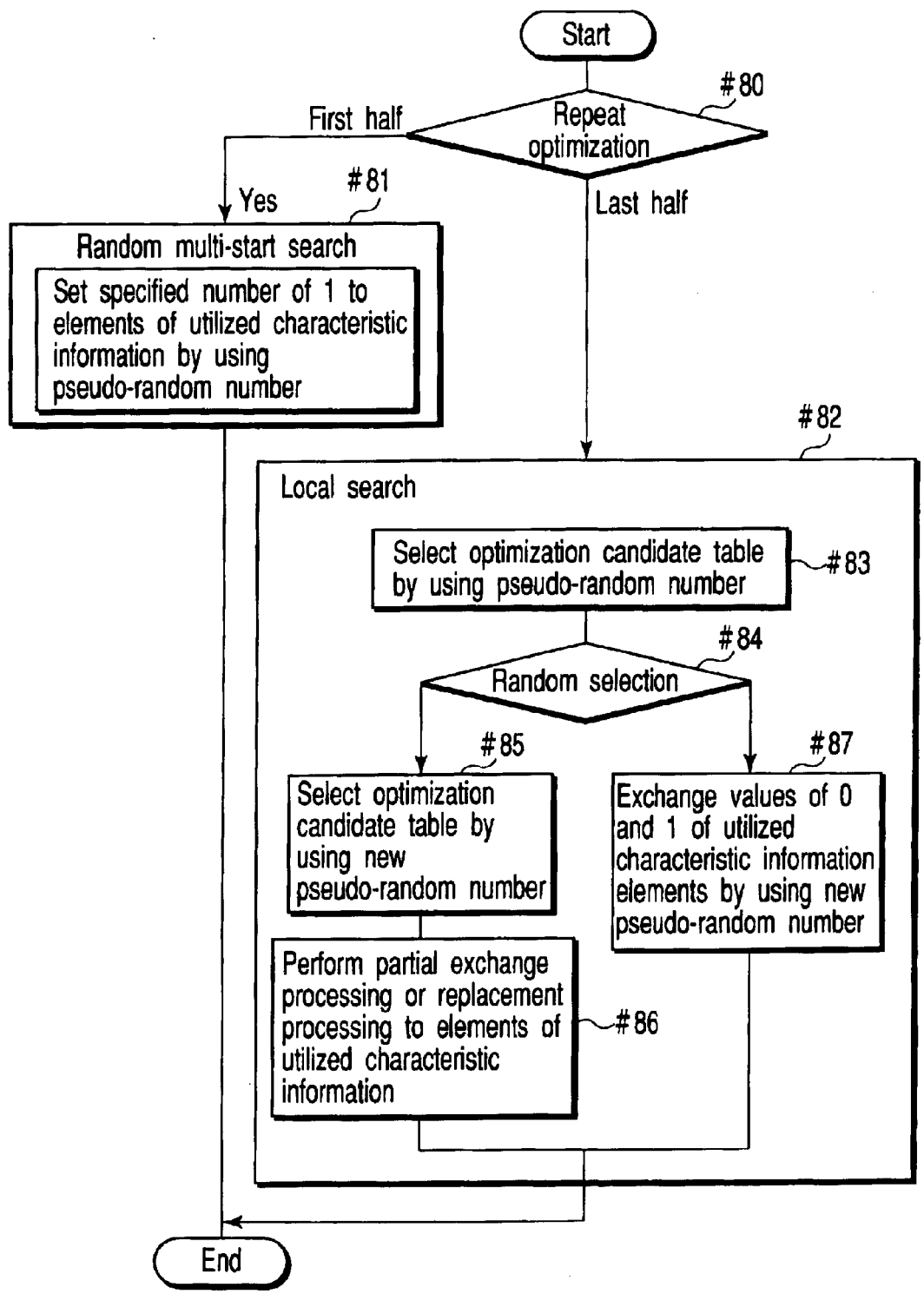
FIG. 14 is a flowchart of an optimization candidate table initializing method and an optimization candidate table selecting/updating method in the second embodiment of the pattern classification apparatus according to the present invention.

The pattern dictionary optimizing means 23 initializes the optimization candidate table 21 used for optimization or selects the optimization candidate table 21, and changes the utilized characteristic quantity information 22 in accordance with a flowchart of the method for initializing the optimization candidate table 21 and the method for selecting/changing this optimization candidate table 21 shown in FIG. 14.

At a step #80, the pattern dictionary optimizing means 23 first judges whether processing is in the first half or the last half of search. If it is in the first half of search, the pattern dictionary optimizing means 23 advances to the step #81 and effects random multi-start search. In the random multi-start search, a specified number of "1" are set to elements of the utilized characteristic quantity information 22 by using pseudo-random numbers. In the random multi-start search, it is determined that a number of sets of the utilized characteristic quantity information 22 is fixed.

If it is in the last half of search, the pattern dictionary optimizing means 23 advances to the step #82 and performs local search. In this local search, the optimization candidate table 21 is selected by using pseudo-random numbers at the step #83, and random selection is carried out at the next step #84.

In one random selection, the optimization candidate table 21 is selected by using a new pseudo-random number at the step #85, and the utilized characteristic quantity information elements are partially changed or replaced at the next step #86.

In the other random selection, at a step #87, values of "0" and "1" of the utilized characteristic quantity information elements are exchanged by using a new pseudo-random number.

That is, in local search in the last half of search, the randomly selected utilized characteristic quantity information 22 is replaced with the other randomly selected non-utilized characteristic quantity, or use/non-use of the randomly selected quantity of characteristics is implemented with a given probability, and the pattern classification ratio is evaluated at the same time, thereby selecting a combination with which the excellent pattern classification ratio is obtained.

At the steps #85 and #86, replacement/substitution processing is carried out between different table elements. At a step #87, replacement processing is carried out in the same table selected at the step #83.

As described above, the dictionary optimization processing for obtaining the excellent pattern classification ratio is effected.

Subsequently, the pattern dictionary optimizing means 23 selects a registered pattern (m) 7 at the next step #62 shown in FIG. 13., and judges whether a number of the registered patterns 7 for each classification category of the selected registered pattern (m) 7 is not less than 2 at the next step #63.

At the step #63, if a number of the registered patterns 7 is not less than 2, the pattern dictionary optimizing means 23 advances to a step #64 and eliminates the registered pattern (m) 7 from the target of creating the Mahalanobis dictionary 12.

Then, at a step #65, the pattern dictionary optimizing means 23 creates the Mahalanobis dictionary (the mean value matrix d, the inverse matrix $V^{-1}$ of the common variance/covariance matrix) 8 by using only the selected quantity of pattern characteristics 10.

Subsequently, at a step #66, the pattern dictionary optimizing means 23 performs pattern classification processing with respect to the registered pattern (m) 7. That is, the pattern dictionary optimizing means 23 calculates and obtains the Mahalanobis distance $D^2$ by using the expression (7).

At a step #67, the pattern dictionary optimizing means 23 then aggregates classification results.

Further, the pattern dictionary optimizing means 23 judges whether processing has been completed with respect to all the registered patterns 7 (M=1, 2, 3, . . . ,) at a step #68.

If it is found that processing is yet to be completed with respect to all the registered patterns 7 (M=1, 2, 3, . . . ,) as a result of judgment, the pattern dictionary optimizing means 23 returns to the step #62.

If processing has been completed with respect to all the registered patterns 7 (M=1, 2, 3, . . . ,), the pattern dictionary optimizing means 23 advances to a step #69 and updates the optimization candidate table 21 based on the classification result.

Then, at a step #70, the pattern dictionary optimizing means 23 judges whether repetition of optimization has been completed based on the optimization repetition end information. If repetition of optimization has not been completed, the pattern dictionary optimizing means 23 returns to the step #61. If repetition of optimization has been completed, the pattern dictionary optimizing means 23 advances to a step #71 and creates the Mahalanobis dictionary (the mean value matrix d and the inverse matrix $V^{-1}$ of the common variance/covariance matrix) 8 based on the utilized characteristic quantity information 22 having the maximum predicted classification ratio 15 and the minimum mean classification distance 16 in the optimization candidate table 21.

The characteristic quantity classifying means 17 performs pattern classification based on the quantity of pattern characteristics calculated by the classification characteristic quantity extracting means 4 and the Mahalanobis dictionary 8 registered in the pattern dictionary 6, namely, calculates the Mahalanobis distance $D^2$ shown in the expression (7) and obtains the classification result 18 of the quantity of characteristics.

In the second embodiment, there is provided the pattern dictionary optimizing means 23 which executes processing for searching the utilized characteristic quantity information indicative of use/non-use of the quantity of pattern characteristics utilized for calculating the Mahalanobis distance $D^2$ by using the quantity of pattern characteristics 10 of the registered pattern 7 and its classification category name 9 in the pattern dictionary 6. For example, the pattern dictionary optimizing means 23 restricts an integer of "0" or "1" to be taken as the diagonal element of the pattern characteristic quantity weighting matrix and determines one-dimensional information as the pattern characteristic quantity weighting information. Therefore, the advantage similar to that in the first embodiment can be obtained, and the quantity of pattern classification characteristics is restricted to one which utilizes the size of the mean value matrix (d) 11 or the inverse matrix $V^{-1}$ of the common variance/covariance matrix which is required as the Mahalanobis dictionary 8, thereby reducing the necessary memory capacity or quantity of calculation.

It is to be noted that the second embodiment can be modified as follows.

Figure 15:
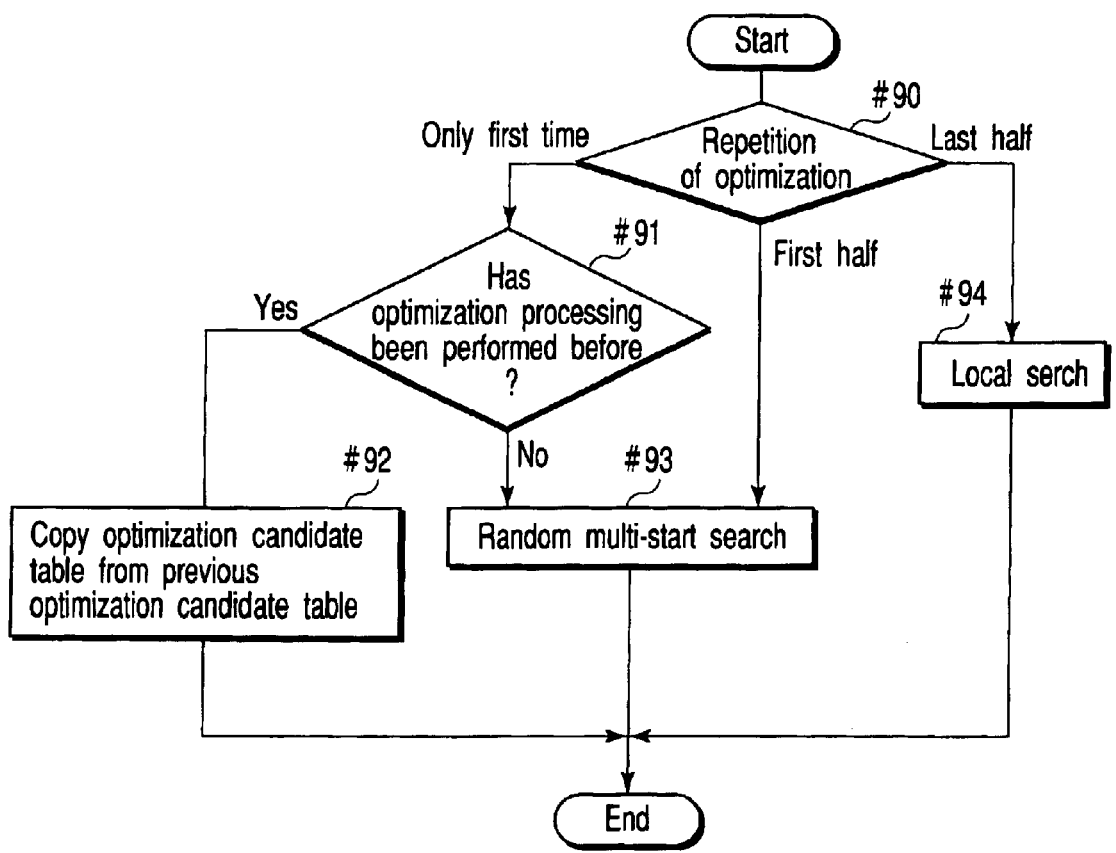
FIG. 15 is a flowchart showing a modification of the optimization candidate table initializing method and the optimization candidate table selecting/updating method in the second embodiment of the pattern classification apparatus according to the present invention.

In FIG. 15, the pattern dictionary optimizing means 23 judges whether the search is carried out for the first time, or in the first half or the last half at a step #90. If it is the first time, the pattern dictionary optimizing means 23 advances to a step #91 and judges whether optimization processing has been carried out before.

If it is found that the optimization processing has been carried out before as a result of judgment, the pattern dictionary optimizing means 23 advances to a step #92 and copies the optimization candidate table 21 from the already created optimization candidate table 21.

If the optimization processing has not been carried out before, the pattern dictionary optimizing means 23 proceeds to a step #93 and performs the above-described random multi-start search.

Furthermore, if it is found that search is carried out in the first half as a result of judgment at the step #90, the pattern dictionary optimizing means 23 proceeds to the step #93 and effects the random multi-start search. In case of the last half, the pattern dictionary optimizing means 23 advances to the step #94 and executes the local search.

Figure 16:
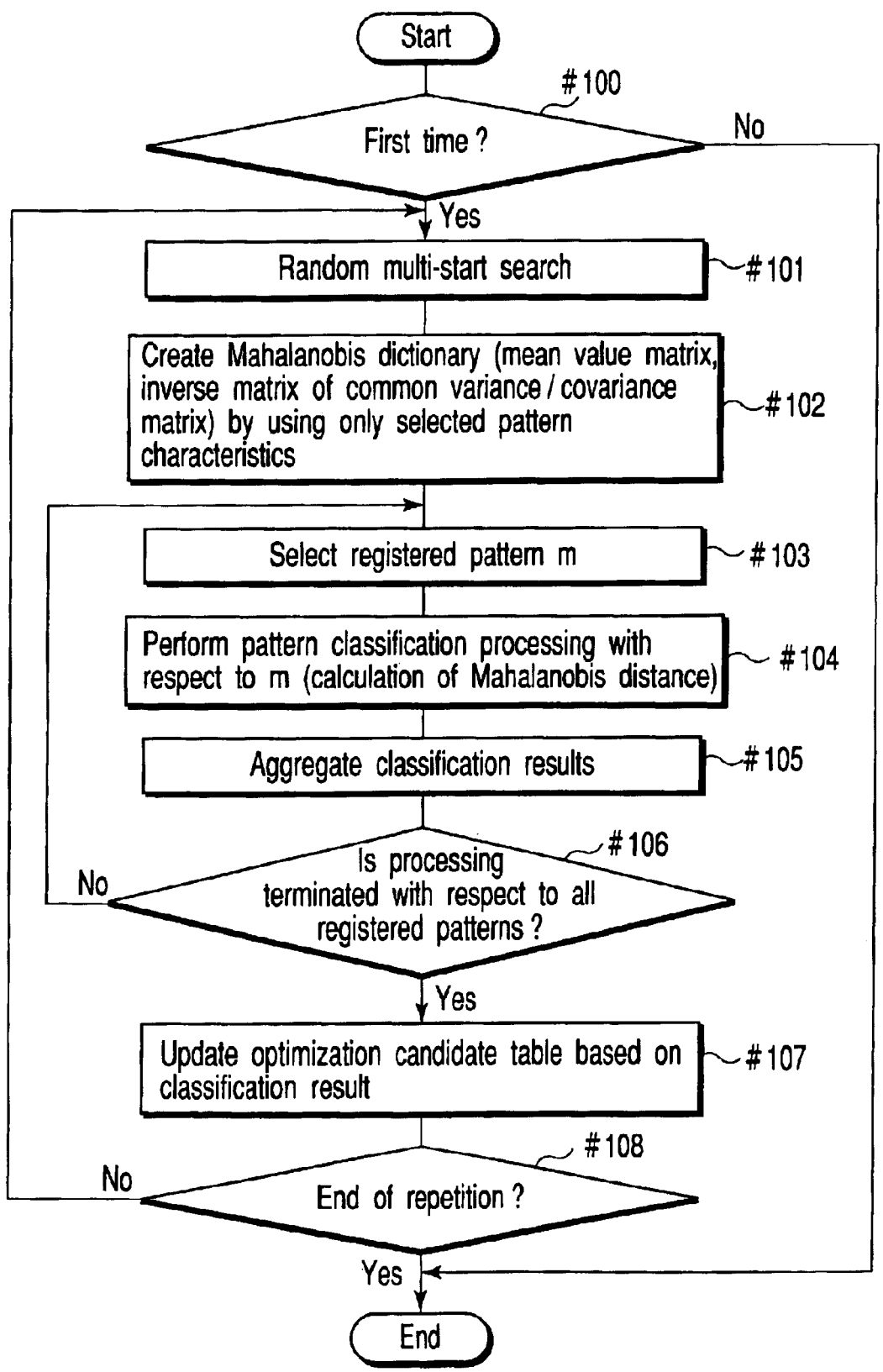
FIG. 16 is a flowchart showing a modification of the optimization candidate table initializing method in the second embodiment of the pattern classification apparatus according to the present invention.

In FIG. 16, at a step #100, the pattern dictionary optimizing means 23 judges whether the search is carried our for the first time. If it is the first time, the pattern dictionary optimizing means 23 advances to the step #101 and performs the random multi-start search.

Subsequently, at a step #102, the pattern dictionary optimizing means 23 creates the Mahalanobis dictionary (the mean value matrix (d) 11, the inverse matrix $V^{-1}$ of the common variance/covariance matrix) 8 by using only the selected quantity of pattern characteristics 10.

Then, at a step #103, the pattern dictionary optimizing means 23 selects the registered pattern (m) 7. At a step #104, the pattern dictionary optimizing means 23 performs pattern classification processing with respect to the selected registered pattern (m) 7, namely, calculates the Mahalanobis distance $D^2$ by using the expression (7).

Then, the pattern dictionary optimizing means 23 aggregates the classification results at a step #105.

At a step #106, the pattern dictionary optimizing means 23 judges whether processing has been completed with respect to all the registered patterns 7 (M=1, 2, 3, . . . ,).

If it is found that processing has been completed with respect to all the registered patterns 7 (M=1, 2, 3, . . . ,) as a result of judgment, the pattern dictionary optimizing means 23 advances to a step #107 and updates the optimization candidate table 13 based on the classification result.

In addition, if repetition is yet to be terminated, the pattern dictionary optimizing means 23 returns to the step #101.

The flowchart of the method for initializing the optimization candidate table 21 and the method for selecting/updating the optimization candidate table 21 shown in FIGS. 15 and 16 may be arranged and executed at the rear stage of the processing for initializing the optimization candidate table of the Mahalanobis dictionary 8 illustrated in FIG. 7.

As a local search method, genetic exchange processing in GA (Genetic Algorithm) may be carried out between the superior candidates of the predicted classification ratio, namely, different quantities of characteristics between two pairs of utilized characteristic quantities as targets may be appropriately exchanged. Additionally, as similar to the simulated annealing method, a combination by which the pattern classification ratio is lowered with a given probability may be allowed. By doing so, it is possible to easily create the classification dictionary having the combined quantities of characteristics of the pattern classification ratios which are better that those obtained by exchange of the randomly selected quantities of characteristics.

According to the present invention, it is possible to execute optimization search which finds which quantity of pattern characteristic used for creating the Mahalanobis dictionary can effectively act on the pattern classification ratio with each registered pattern in the pattern dictionary being used as a target. Further, as a result of the optimization search, it is possible to assure the pattern classification accuracy equal to or above the pattern classification accuracy in the Mahalanobis dictionary created by utilizing at least all the quantities of pattern characteristics or the Mahalanobis dictionary created by utilizing the effective quantity of characteristics predicted by analysis of main components.

Furthermore, as a classification result which is outputted when presuming that some of the registered patterns in the pattern dictionary are inputted as unknown patterns, it is possible to assure that the pattern classification accuracy is equal to approximately the predicted classification ratio.

Only a number of types of the quantities of pattern classification characteristics to be utilized is restricted with respect to the size of the mean value matrix (d) or the inverse matrix $V^{-1}$ of the common variance/covariance matrix which must be created as the Mahalanobis dictionary, thereby reducing the necessary memory capacity or quantity of calculation.

The present invention relates to the pattern classification method and apparatus which perform optimization processing of the pattern dictionary used for pattern classification of defect types or the like, and to a storage medium readable by a computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer-implemented pattern classification method comprising:

extracting a quantity of pattern characteristics from a pattern classification target;

registering and setting classification category information corresponding to said quantity of pattern characteristics in a pattern dictionary;

correcting a Mahalanobis dictionary by optimizing said pattern dictionary based on said classification category information and said quantity of pattern characteristics stored in said pattern dictionary; and performing pattern classification based on said quantity of pattern characteristics and said corrected Mahalanobis dictionary registered in said pattern dictionary.

2. The computer-implemented pattern classification method according to claim 1, wherein said Mahalanobis dictionary includes an optimization candidate table having a utilized characteristic quantity weighting matrix and a predicted classification ratio or utilized characteristic quantity information and a predicted classification ratio as elements.

3. A pattern classification apparatus comprising:

a pattern dictionary which stores a quantity of pattern characteristics extracted from a pattern classification target and classification category information corresponding to said quantity of pattern characteristics:

pattern dictionary optimizing means for correcting a Mahalanobis dictionary by optimizing said pattern dictionary based on said classification category information and said quantity of pattern charactaristics stored in said pattern dictionary; and means for performing pattern classification based on said quantity of pattern characteristics and said corrected Mahalanobis dictionary registered in said pattern dictionary.

4. A pattern classification apparatus comprising:

pattern fetching means for fetching a pattern classification target;

pattern area extracting means for extracting a specific pattern area from said pattern classification target supplied from said pattern fetching means;

classification characteristic quantity extracting means for calculating a quantity of pattern characteristics useful for pattern classification from said specific pattern area supplied from said pattern area extracting means;

dictionary registering means for registering and setting in a pattern dictionary said quantity of pattern characteristics calculated by said classification characteristic quantity extracting means and classification category information corresponding to said quantity of pattern characteristics;

characteristic quantity classifying means for performing pattern classification based on said quantity of pattern characteristics calculated by said classification characteristic quantity extracting means and a Mahalanobis dictionary registered in said pattern dictionary; and pattern dictionary optimizing means for correcting said Mahalanobis dictionary by performing optimization processing based on said classification category information and said pattern characteristic quantity stored in said pattern dictionary.

5. The pattern classification apparatus according to claim 4, wherein said, pattern, dictionary optimizing means has a function to execute processing for searching a pattern characteristic quantity weighting matrix which weights said quantity of pattern characteristics utilized for calculation of said Mahalanobis, distance by using said quantity of pattern characteristics and said classification category information of a registered pattern in said pattern dictionary.

6. The pattern classification apparatus according to claim 3, wherein said Mahalanobis dictionary includes an optimization candidate table.

7. A computer readable storage medium storing a program of a pattern classification method comprising:

registering and setting in a pattern dictionary a quantity of pattern characteristics extracted from a pattern classification target and classification category information corresponding to said quantity of pattern characteristics;

correction a Mahalanobis dictionary by performing optimization processing based on said classification category information and said quantity of pattern characteristics stored in said pattern dictionary; and performing pattern classification based on said optimized quantity of pattern characteristics and said corrected Mahalanobis dictionary registered in said pattern dictionary.

8. The pattern classification apparatus according to claim 4, wherein said Mahalanobis dictionary includes an optimization candidate table.

9. The pattern classification apparatus according to claim 5, wherein said Mahalanobis dictionary includes an optimization candidate table.

* * * * *